June 3, 1947.  J. COZZA  2,421,373
HEAT SEALING ELEMENT
Filed June 9, 1944
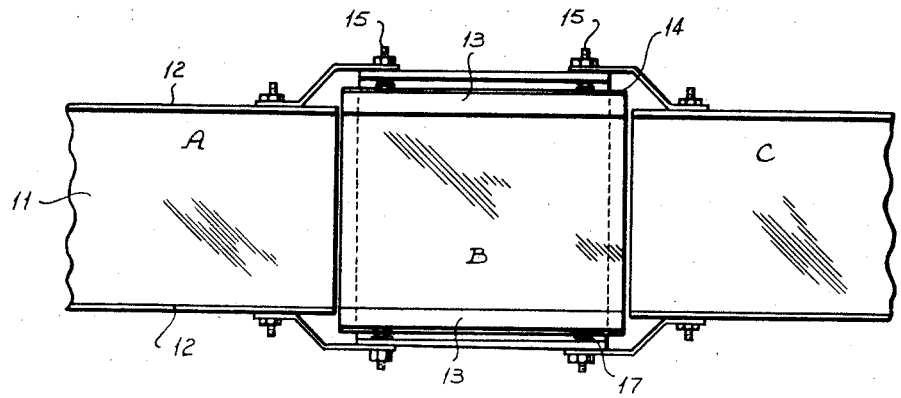
Fig 1
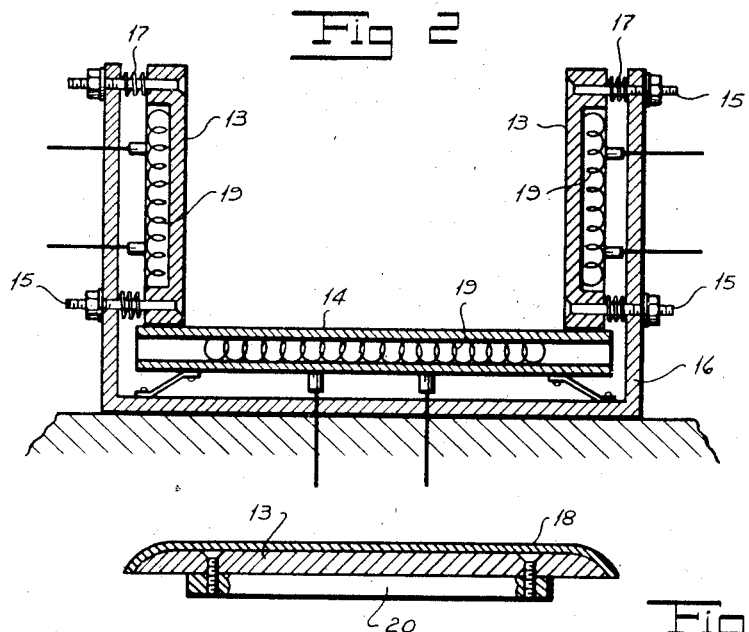
Fig 2
Fig 3
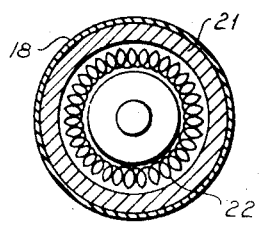
Fig 4
INVENTOR.
JOHN COZZA
BY Worth Wade
ATTORNEY Patented June 3, 1947

2,421,373

UNITED STATES PATENT OFFICE 2,421,373

HEAT-SEALING ELEMENT

John Cozza, Brooklyn, N. Y., assignor, by mesne assignments, to American Viscose Corporation, Wilmington, Del., a corporation of Delaware Application June 9, 1944, Serial No. 539,541

4 Claims. (Cl. 154—42)

The invention relates in general to wrapping and packaging and in particular to apparatus for heat-sealing wrappers, bags, and packages formed of or coated with a hydrophobic heat-sealable material.

In machines used for heat-sealing wrappers, bags of packages, it has been found that the thermoplastic sheet material or coating tends to adhere to the heated metal surfaces of the sealing device. The adhesion of the thermoplastic material to such metal parts is due to the fact that to fuse the thermoplastic material to itself it is necessary to heat it until the surface of the material is rendered tacky. Such adhesion results in some of the thermoplastic material remaining on the sealing surface of the heat-sealing plates or rollers, forming a sticky deposit which decreases the speed of the machine, increases the temperature necessary for proper sealing, causes smudging, soiling and scratching of the sheet material and promotes the corrosion of the metal surfaces.

Prior automatic machines containing heat-sealing or crimping elements which slide relative to the thermoplastic material being sealed and/or crimped are subject to the above disadvantages because there is direct contact between the thermoplastic material and the metal surface while the thermoplastic material is tacky. The resulting deposits char, causing uneven heating and scratching of the material being heat-sealed and necessitating frequent cleaning of the metal surfaces of the heat-sealing plates or rollers.

It is a general object of the present invention to provide means for overcoming the disadvantages above mentioned.

It is a specific object of the invention to provide a heat-sealing element which will not adhere to the thermoplastic material being sealed.

It is another specific object of the invention to provide an apparatus for heat-sealing and/or crimping thermoplastic material in which the metal surfaces of the heat-sealing elements will remain smooth and clean for a long period during operation.

Other objects of the invention will in part be obvious and will in part appear hereinafter.

Applicant has found that the disadvantages of prior heat-sealing devices may be overcome by covering the heat-sealing surface with a smooth continuous coating comprising a film-forming hydrophilic material containing dispersed therein particles of colloidal graphite, since such a coating shows no tendency to adhere to hydrophobic thermoplastic materials.

According to the present invention, there is provided a heat-sealing and/or crimping device comprising metal sealing elements, the sealing surface of which is covered with a thin continuous coating of a film-forming hydrophilic colloid containing a minor proportion by weight of finely divided graphite, said coating being smooth, nonvolatile and heat-conducting, and means for heating said coated sealing surface.

While the invention has particular utility as sealing devices wherein the thermoplastic sheet or coating to be sealed makes sliding contact with a heated sealing surface such as a plate, the invention is not confined to such devices and may comprise sealing devices in the form of jaws, platens, shoes and heat-sealing rollers; also devices designed for simultaneously heat-sealing and crimping, embossing, or corrugating. The sealing device incorporating the invention may be hand operated, semi-automatic or fully automatic.

For a better understanding of the invention reference should be had to the appended drawings, in which:

Fig. 1 is a top plan view of one embodiment of the heat-sealing apparatus of the invention;

Fig. 2 is an end elevation of the intermediate sealing section of the apparatus of Fig. 1;

Fig. 3 is a cross-sectional view of one embodiment of the heat-sealing element of the invention in the form of a plate; and Fig. 4 is a cross-sectional view of another embodiment of the invention in the form of a roller.

In Fig. 1 there is shown one embodiment of the sealing device in the form of a sealing trough for wrapped articles, comprising a section A for guiding the wrapped article to be sealed into sealing position, a section B wherein the sealing operation is effected, and a section C through which the sealed package is removed from the intermediate sealing section. However, it should be understood that the invention may be used in any form of packaging and/or sealing apparatus which comprises a heat-sealing plate such as is more particularly illustrated in Fig. 3.

The guiding trough has a base 11 and side walls 12, end-sealing plates 13 and a bottom plate 14 for sealing the longitudinal seam on the bottom of the wrapped article. The plates 13 and 14 are covered, as shown in Fig. 3, with a thin continuous film 18 of the hydrophilic film-forming material containing a minor proportion of graphite dispersed therein. The side plates 13 are preferably mounted on bolts 15 which project from a frame 16 through openings provided in the side plates 13, the bolts being surrounded by compression springs 17, thus providing means for yieldably supporting the side plates. It is to be understood that any suitable means may be employed for heating the bottom and side plates such, for example, as electric resistant coils 19 connected in parallel and positioned in a block 20 on the opposite side of the sealing plates from the sealing surface as shown in Fig. 2.

In Fig. 3 there is shown one embodiment of a sealing element comprising the sealing plate 13 having the thin continuous coating 18 disposed over the sealing surface thereof, the opposite side of the plate being fastened to an electrically heated block 20.

In Fig. 4 there is shown another embodiment of the invention comprising a heat-sealing roller 21 heated by means of the electric coils 22 and having a continuous surface coating 18 of hydrophilic material thereon.

The heat-sealable materials to which the present invention is applicable are sheet materials or coatings formed of thermoplastic hydrophobic materials, such, for example, as thermoplastic cellulose derivatives, thermoplastic resins and thermoplastic synthetic rubbers and waxes. Thus, the invention is applicable for sealing sheet material formed of or coated with a thermoplastic hydrophobic material, such, for example, as thermoplastic cellulose derivatives as a class, thermoplastic resins as a class, synthetic rubbers and waxes. When the sheet material is of the coated type, the sheet itself may be of a non-fibrous and non-heat-sealable film, such, for example, as regenerated cellulose, a cellulose ester, a cellulose ether, a synthetic resin, a synthetic rubber, gelatin, casein, deacetylated chitin or other non-fibrous organic plastic materials; or the base sheet may be a fibrous material, such, for example, as paper, glassine, felt, leather textile fabric, or the like. The invention has particular application, however, to the heat-sealing of glycerinated regenerated cellulose which has been coated on one or both sides with a thermoplastic hydrophobic heat-sealable composition comprising a film-forming base, a plasticizer, a wax-blending agent and a wax. So long as the sheet material, however, is formed of or coated with a thermoplastic heat-sealable material which is hydrophobic, the particular composition of the sheet material or its coating is immaterial.

The coating applied according to the invention to the sealing surfaces of the apparatus comprises in general a colloidal solution containing graphite particles in a minor proportion by weight of the coating. The amount of graphite used is insufficient to break the continuity of the hydrophilic film formed after evaporation of the solvent. In the now preferred embodiment the coating composition comprises an aqueous dispersion of a hydrophilic film-forming material and a minor proportion of finely divided graphite, the proportion of the film-forming material to the graphite being preferably 2:1. For the film-forming hydrophilic material there may be used any of the group of film-forming hydrophilic plastics, such, for example, as water-soluble cellulose ethers, cellulose ethers which are soluble in aqueous dilute alkali solutions, water-soluble salts of carboxy-alkyl cellulose ethers as a class, such, for example, as polyvinyl alcohol, gelatin, casein, water-soluble natural gums and hydrophilic synthetic resins, all of which are film-forming and which also have the property, in solution, of acting as a protective colloid and thus preventing the separation of the graphite from the aqueous vehicle. In the preferred embodiment the film-forming material is water-soluble cellulose ether.

By way of illustration but not by way of limiting the invention, the coating composition for the sealing surface may comprise the following ingredients:

| | Parts |
|---|---|
| Water-soluble cellulose ether | 4 |
| Finely divided graphite | 2 |
| Distilled water | 94 |

When gelatin is employed as the film-forming material a suitable hardening agent may be added, such, for example, as a soluble dichromate or formaldehyde. When casein is used the solution should comprise, in addition, sufficient ammonium hydroxide to maintain the casein in solution.

Before putting the machine into operation the sealing surface is carefully cleaned by means of acid, alkali, or an abrasive such as sandpaper, steel wool, or the like, and the coating composition is applied to the clean plates while they are cold or, in any case, while they are at a temperature below 100° C., after which the treated plates are heated to a temperature above 100° C. to evaporate the solvent, e. g., the water, and to deposit the composition thereon in the form of a continuous film. If necessary or desired one may apply a plurality of coatings to the same metal surface in order to build up a thicker film in which case it is desirable to heat the plates about 100° C. between each application of the solution. After the film has been dried on the plates, the coating is rubbed down and polished with a chamois or a piece of cardboard to give a smooth abrasion-resistant surface. The continuous hydrophilic film thus produced is non-volatile, heat-resistant, and a good conductor of heat, but it is also non-thermoplastic and does not become tacky at the temperatures used in heat sealing.

Applicant's coating has several important functions. Since it completely covers the surface of the heated plate, it prevents contact of the metal with the thermoplastic material being sealed, reduces wear of the metal and prevents corrosion. Since the coating is hydrophilic, it has no tendency to stick to the hydrophobic thermoplastic material being sealed, thus permitting, among other advantages, operation of the machine at a higher rate of speed. Since the coating is smooth, friction is reduced, the tendency to accumulate deposits is retarded and the sealing surface remains clean for long periods of time.

It will be found that when the heated sealing elements have been coated with a film according to the present invention, numerous advantages will be apparent in the operation of the machine. These advantages include, among others, that the temperature of the heat-sealing operation may be reduced thus affording greater ease in operation and avoiding the possibility of scorching or embrittling the sheet material. The operating period of the machine between cleaning operations is prolonged. The wear on the heated metal surfaces which are contacted by the sheet is greatly reduced and the coating protects the metal from corrosion. The speed of operation of the machine may be increased. Moreover, the film prevents the accumulation on the sealing plates of dirt, glycerine, sizing agents and plastic material which might soil, smudge or scratch the sheet materials, and the coating is, in addition, non-toxic, non-volatile, non-inflammable and odorless.

The present application is a continuation-in-part of applicant's co-pending application Serial No. 413,192, filed October 1, 1941.

Having described my invention, what I claim and desire to secure by Letters Patent is:

1. In an apparatus for heat-sealing thermoplastic materials in making wrappers, bags and packages, the combination of, a metal heat-sealing element having the sealing surface thereof covered with a smooth continuous dry coating comprising film-forming hydrophilic material containing dispersed therein a minor proportion of colloidal graphite, and means for heating said element.

2. In an apparatus for heat-sealing thermoplastic materials in making wrappers, bags and packages, the combination of, a metal heat-sealing plate adapted to undergo sliding movement in relation to the thermoplastic sheet material to be sealed, said plate having the sealing surface thereof covered with a smooth continuous dry coating comprising film-forming hydrophilic material containing dispersed therein a minor proportion of colloidal graphite, and means for heating said plate.

3. In an apparatus for heat-sealing thermoplastic materials in making wrappers, bags and packages, the combination of, a metal heat-sealing roller adapted to undergo sliding movement in relation to the thermoplastic sheet material to be sealed, said roller having the sealing surface thereof covered with a smooth continuous dry coating comprising film-forming hydrophilic material containing dispersed therein a minor proportion of colloidal graphite, and means for heating said roller.

4. In an apparatus for heat sealing thermoplastic sheet material, the combination of, a metal heat sealing element having the sealing surface thereof covered with a smooth continuous dry coating comprising film-forming hydrophilic material containing colloidal graphite dispersed therein, the ratio of film-forming material to the graphite being not less than 2 to 1, and means for heating said element.

JOHN COZZA.

REFERENCES CITED

The following references are of record in the file of this patent:

UNITED STATES PATENTS

| Number | Name | Date |
| --- | --- | --- |
| 1,756,919 | Becker et al. | Apr. 29, 1930 |
| 1,948,570 | Ferenci | Feb. 27, 1934 |
| Re. 20,789 | Bergstein | July 12, 1938 |
| 2,114,625 | Bergstein | Apr. 19, 1938 |
| 2,196,128 | Stuart | Apr. 2, 1940 |